Jan. 2, 1923. 1,440,508.
H. H. TODD.
HOSE COUPLING.
FILED JAN. 31, 1921.
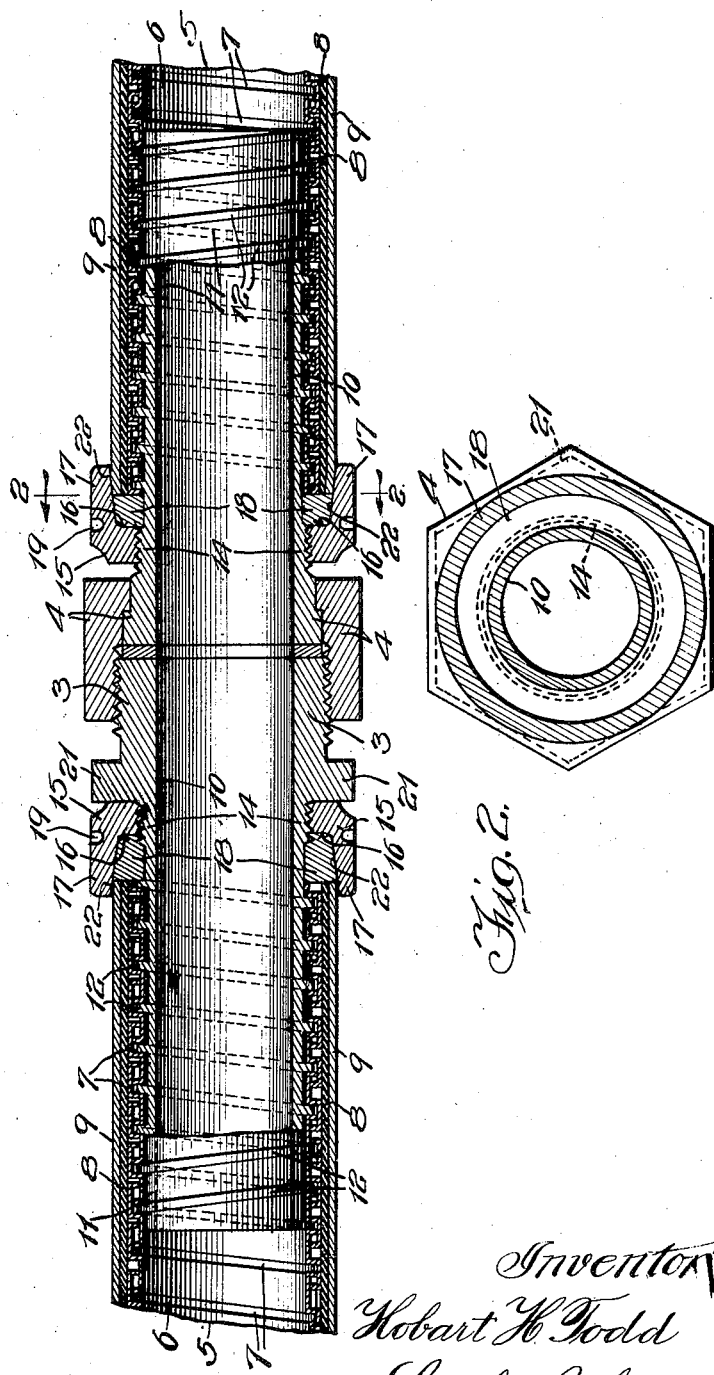

Patented Jan. 2, 1923.

1,440,508

UNITED STATES PATENT OFFICE.

HOBART H. TODD, OF OAK PARK, ILLINOIS.

HOSE COUPLING.

Application filed January 31, 1921. Serial No. 441,176.

*To all whom it may concern:*

Be it known that I, HOBART H. TODD, a citizen of the United States, residing in Oak Park, Cook County, Illinois, have made certain new and useful Improvements Relating to Hose Couplings, of which the following is a specification.

An important object of these improvements is to provide simple, strong and effective means, which are free from notable objections, for securing a tight joint between a coupling member and a flexible hose of the well-known type which contains an inner armor of metal spirally wound providing a spiral recess which may be made to coact with threads upon a portion of the coupling member. The inner armor of such hose sections is quite flexible and the adjacent turns of the metal strip of which it is formed move upon each other when bending or when twisting with respect to each other adjacent parts of the hose. In the twisting operation the diameter of the inner armor becomes greater or less according to the direction of twist.

If a cylindrical member having suitable exterior threads and of substantially the normal inner proportions of the armor be threaded into this armor the threading operation will proceed quite easily owing to the slight enlargement of the interior diameter of the armor due to the natural twisting which takes place when the coupling member and the hose are threaded together; but on the reverse action, owing to a reversal of the twisting action upon the hose, the armor binds tightly upon the coupling member and usually it is substantially impossible to get the hose section off without a difficult operation and one which results in ruining the end portion of the hose. This binding action is well known to exist in couplings heretofore suggested for such hose.

A specific object of these improvements is to provide a form of connection which makes the desired tight joint and yet provides for the easy removal of the coupling from the hose. With respect to my novel means for making a tight joint around the end of the hose the invention is not limited to hose of the interiorly armored type. Other objects and advantages will appear hereinafter.

In the accompanying drawings, which form a part of this specification, Figure 1 is a longitudinal vertical medial section through two flexible hose parts of the interiorly armored kind hereinabove mentioned, and through two forms of coupling members, these members being shown as connected together, this application illustrating how various lengths of flexible hose may be securely connected together in the desired tight relation; and Fig. 2 is a vertical transverse section on the line 2—2 of Fig. 1 viewed in the direction of the arrows.

The hose sections 5 are shown as having the interior flexible armor 6 providing spirally-arranged recesses 7. There is a rubber covering 8 vulcanized upon the armor 6, and a layer of fabric 9 is woven upon the rubber 8. The hose itself requires but little description as it is a well-known article of trade.

The coupling device at the left hand of Fig. 1 is a male member having the nipple 3, while the one at the right hand of Fig. 1 is a female member having the ordinary union 4, these two forms differing from each other materially only in this respect. These features are well known and of ordinary form. Each coupling member has a tubular body portion, a movable packing or compression member threaded thereon and an exteriorly threaded end portion adapted to be screwed into a hose section. Like reference numerals are applied to like parts and a specific description of one will suffice for both.

More specifically, then, the tubular body portion 10 has a relatively long stem or end portion 11 having the exterior threads 12 adapted to engage the spiral recesses 7 of the armor 6. It will be noted from the drawings that the end portion 11 fits somewhat loosely in the armor. In actual practice the proportions of the end member 11 need to be reduced but slightly over those of the interior portions of the armor since the increase and decrease of the diameter of the armor is not very great under ordinary twisting strains.

Adjacent to the end of the hose I provide on the body 10 the exteriorly-threaded cylindrical portion 14 and threaded upon it is the interiorly-threaded packing or compression cup-shaped member 15. This member 15 has an inner compression wall 16 and a flange portion 17 extending toward the hose and adapted closely to overlie the same about its end portion. The compression wall 16 is spaced from the cross sectional end of the hose when in its normal position, and in this space I provide the annular packing 18. A recess 19 may be bored in the periphery of the compression member 15 to accommodate a spanner wrench for turning this part, although this member 15 may be made hexagonal or given other exterior shapes if desired.

In operation it is only necessary with this device to retract the member 15 against or substantially against the hexagonal wrench-engaging part 21 or the union sleeve 4 as the case may be, apply the packing 18, and then screw the end member 11 into the hose, continuing the operation until the end of the hose presses against the packing 18 as tightly as may conveniently be done by hand. Thereupon the compression member 15 is turned so as to be advanced bodily toward the end of the hose, thus strongly compressing the packing 18 into all of the crevices and uneven places about its end and between the coupling parts there, making a perfectly tight lock against leakage between the coupling and the hose.

Importantly, the hose is now firmly locked against retraction, for the compression brought upon the end portions of the armor cause it so to bind upon the end member 11 that any attempt to retract the hose through an unscrewing action results in developing the further binding action induced by the twisting operation.

A factor in this binding of the end portion of the hose is the slanting inner surface 22 of the flange 17, which will ordinarily be made to admit the end of the hose freely at the free end of the flange and compress the same more and more as the hose and the compression member 15 are brought more and more together in the longitudinal direction.

When it is desired to withdraw the coupling from the hose it is only necessary to retract the compression member 15, releasing the pressure from the end portions of the hose, and thereupon the parts may be separated by an unscrewing motion.

In the left hand part of Fig. 1 the several parts are shown in their normal positions when the hose has been threaded upon the stem or end member 11 and the packing has been somewhat compressed so as to fill all of the intervening space. At the right hand end of Fig. 1 the compression member 15 has been rotated relative to the body portion 10 so as to place the packing 18 and the end portion of the hose under compression.

All of the coupling parts are made in my practice of brass, but any suitable materials may be employed.

Reference should be had to the appended claims to determine the scope of the improvements herein set forth.

I claim:

1. In a coupling of the character described, the combination of a tubular body having a substantially cylindrical end portion adapted to project into the hollow interior of a flexible hose, with means for holding said end portion securely therein, said body having a cylindrical exteriorly-threaded section adjacent to the place where the hose terminates when normally on said end portion, and an interiorly threaded packing member in threaded engagement with said exteriorly-threaded section, said packing member having an annular inner compression wall and an annular flange portion extending therefrom and adapted closely to overlie the hose about its end when the hose is normally on the device, said inner end wall substantially facing but being spaced from the sectional end surface of the hose normally on the device, said last-mentioned space being adapted to receive packing which may be compressed against the end of the hose through the screw action of the packing member.

2. In a hose coupling of the character described, the combination of a tubular body having a substantially cylindrical end portion exteriorly threaded and adapted to project by screw action into the hollow interior of a flexible hose having an interior spirally-wound armor providing a spirally-arranged recess with which said threads may coact, said body having a cylindrical exteriorly-threaded section adjacent to the place where the hose terminates when normally on said end portion, and an interiorly threaded packing member in threaded engagement with said exteriorly-threaded section, said packing member having an annular inner compression wall and an annular flange portion extending therefrom and adapted closely to overlie the hose about its end when the hose is on the device, said inner end walls substantially facing but being spaced from the sectional end surface of the hose normally on the device, said last-mentioned space being adapted to receive packing which may be compressed against the end of the hose through the screw action of the packing member.

3. In a coupling of the character described, the combination of a flexible hose section having an inner metallic armor arranged spirally and providing a spiral recess, the armor being susceptible of an increase and decrease of its diameter through a twisting action applied to the hose, a tubular body having a substantially cylindrical end portion extending into the hollow interior of the flexible hose, said body having exterior threads coacting with the spiral recess of said armor whereby said end portion may be threaded into and out of the hose, said end portion and the threads thereon being of such reduced proportions with respect to the armor that said end portion will not materially bind in the armor when the end portion is being unscrewed out of the hose and the armor is being reduced in diameter due to a twisting action upon it, said body having a cylindrical exteriorly threaded section adjacent to the end of the hose, an interiorly threaded packing member in threaded engagement with said last-mentioned exteriorly-threaded section, said packing member having an annular inner compression wall spaced from the end of the hose and an annular flange portion extending toward the hose and closely overlying the end portion thereof, said flange portion having an annular surface tapering to reduced diameters inward from its free end, said tapering surface being adapted to compress the hose near its end portion, and annular packing between said compression wall and the end of the hose.

4. In a coupling of the character described, the combination of a flexible hose section having an inner metallic armor providing a spiral recess, a coupling device including a tubular body having an external thread of substantially the pitch of said spiral recess and adapted to be inserted by screw action into the end portion of the hose, said coupling device having a substantially cup-shaped portion including an annular inner compression wall spaced from the end of the hose and a flange portion extending therefrom toward the hose and surrounding the end portion thereof, and annular packing filling the space between said compression surface and the end of the hose.

HOBART H. TODD.